United States Patent
Durden et al.

(10) Patent No.: US 7,219,366 B2
(45) Date of Patent: May 15, 2007

(54) SYSTEM AND METHOD FOR PROVIDING VIDEO SERVICES

(75) Inventors: George A. Durden, Alpharetta, GA (US); Paul T. Watson, Alpharetta, GA (US); William C. Versteeg, Alpharetta, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 91 days.

(21) Appl. No.: 11/201,046

(22) Filed: Aug. 10, 2005

(65) Prior Publication Data

US 2005/0278744 A1 Dec. 15, 2005

Related U.S. Application Data

(63) Continuation of application No. 09/417,051, filed on Oct. 13, 1999, now Pat. No. 6,961,955.

(51) Int. Cl.
*H04N 7/173* (2006.01)

(52) U.S. Cl. .................. 725/131; 725/100; 725/134; 725/139; 725/151

(58) Field of Classification Search .................. 725/39, 725/44, 45, 100, 131, 134, 135, 136, 139, 725/142, 151
See application file for complete search history.

(56) References Cited

U.S. PATENT DOCUMENTS

| | | | |
|---|---|---|---|
| 5,949,994 A | 9/1999 | Dupree | |
| 6,604,243 B1 | 8/2003 | Freimann | |
| 6,799,328 B1 | 9/2004 | Freimann | |
| 6,961,955 B1 * | 11/2005 | Durden et al. | 725/151 |

* cited by examiner

*Primary Examiner*—Kieu-Oanh Bui
(74) *Attorney, Agent, or Firm*—Scott P. Zimmerman; Geoff Sutcliffe; Todd Mitchem (57) ABSTRACT

Set top boxes are provided with access to full EIT data streams without having to off-tune from one transport to another. If off-tuning is required, however, a locking mechanism substantially reduces or eliminates service interruption. Data in the additional EIT data streams in the non-home transports is reorganized to be sent by time rather than by service. EIT data is stored in the set top box in an architecture which significantly reduces the redundancy inherent in EIT data, allowing a full 7 days of EIT data to be stored in the set top box memory. The set top box of the present invention is backward compatible with conventional set top boxes.

25 Claims, 6 Drawing Sheets

| | |
|---|---|
| 108a | Full EIT (56 3-hour segments; high spool rate) |
| 108b | Other SI (NIT, SDT, PAT, PMT, ...) |
| 108c | Service $1_{104}$ (Audio & Video) |
| 108d | Service $2_{104}$ (Audio & Video) |
| | |
| $108_N$ | Service $N_{104}$ (Audio & Video) |

$106_1$

| | |
|---|---|
| 110a | Partial EIT (2 current 3-hour segments; high spool rate) |
| 110b | Other SI (NIT, SDT, PAT, PMT, ...) |
| 110c | Service $1_{106\text{-}1}$ (Audio & Video) |
| 110d | Service $2_{106\text{-}1}$ (Audio & Video) |
| | |
| $110_N$ | Service $N_{106\text{-}1}$ (Audio & Video) |

$106_N$

| | |
|---|---|
| 112a | Partial EIT (2 current 3-hour segments; high spool rate) |
| 112b | Other SI (NIT, SDT, PAT, PMT, ...) |
| 112c | Service $1_{106\text{-}N}$ (Audio & Video) |
| 112d | Service $2_{106\text{-}N}$ (Audio & Video) |
| | |
| $112_N$ | Service $N_{106\text{-}N}$ (Audio & Video) |

| | | | |
|---|---|---|---|
| SRV 0 | 1 | 6 | 11 |
| SRV 1 | 2 | 7 | 12 |
| SRV 2 | 3 | 8 | 13 |
| SRV 3 | 4 | 9 | 14 |
| SRV 4 | 5 | 10 | 15 | time →

SYSTEM AND METHOD FOR PROVIDING VIDEO SERVICES

CROSS-REFERENCE TO RELATED APPLICATIONS

This application is a continuation of the commonly assigned U.S. application Ser. No. 09/417,051, filed Oct. 13, 1999 now U.S. Pat. No. 6,961,955, entitled "System and Method for Providing Video Services," and incorporated herein by reference in its entirety.

BACKGROUND

1. Field of Invention

The present invention relates generally to the field of providing video services. More specifically, the present invention relates to transmittal and storage of electronic program guide data.

2. Background of the Invention

Conventional set top boxes distribute video services to subscribers over a number of media, including cable, satellite, broadcast and terrestrial systems. These video services include (1) traditional broadcast and cable television programs, (2) video services, such as pay-per-view, near video-on-demand, promotional channels, electronic programming guides (EPGs), and localized or specially formatted information, (3) cable delivered PC-based content and services, and (4) interactive services. The term set top box (STB) refers to any interface device used to interface the video services provided by a service provider to a subscriber's graphic display device, such as a television, over one of the aforementioned media.

Figure 1:
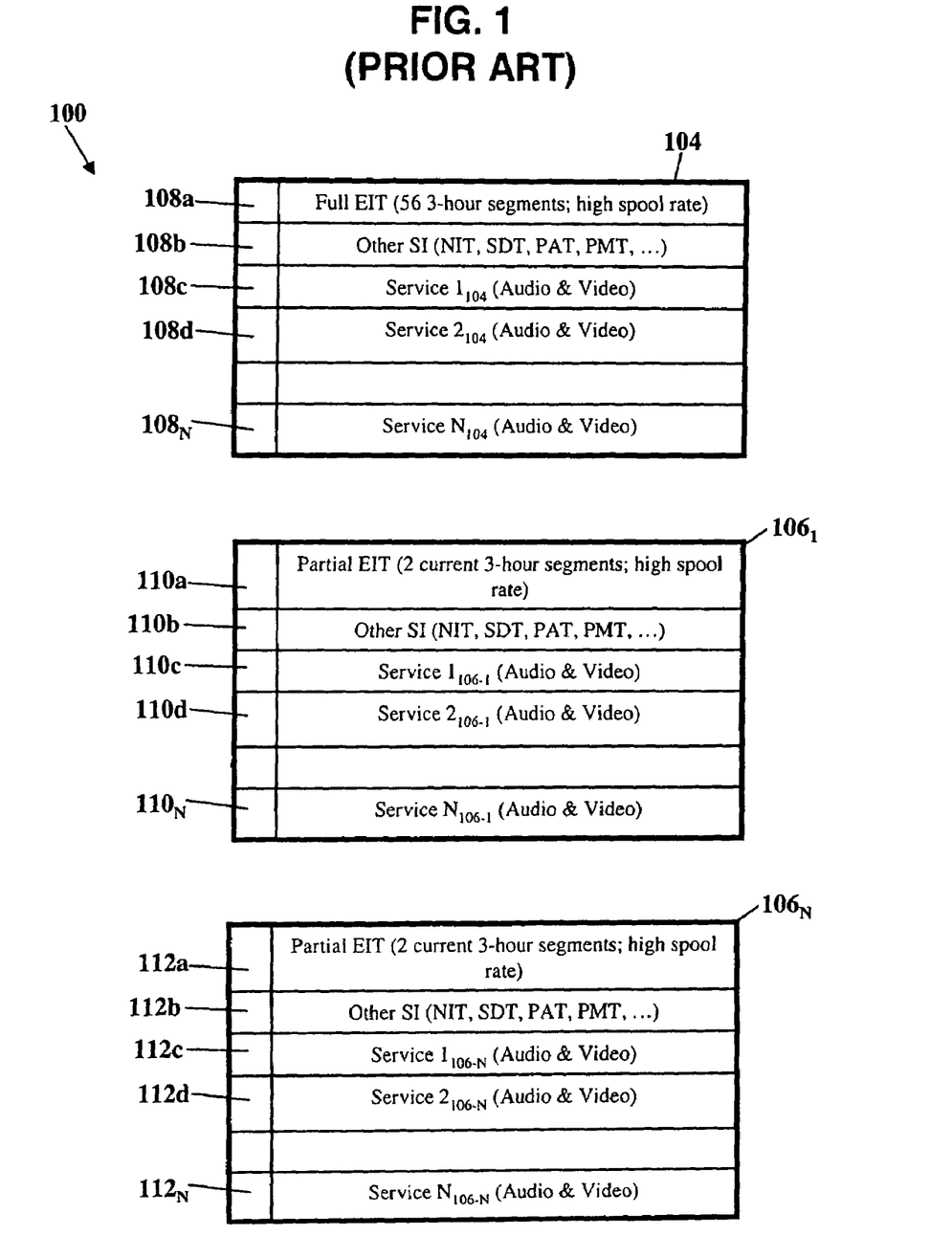
FIG. 1 is a schematic diagram illustrating a prior art transport structure.

The video services are transmitted in constructs called transports. Each transport carries one or more video services from a service provider to a subscriber. FIG. 1 illustrates an exemplary transport architecture 100. Transport architecture 100 includes a home transport 104 and n non-home transports $106_1$–$106_N$. Each transport is transmitted on a unique frequency (or other transmission paradigm, for example, a transponder in the case of satellite).

Home transport 104 contains a full event information table (EIT) data set. The full EIT data carries all information corresponding to a 7-day period of events. Each event contains information related to the services carried in the transports, for example, television programming information (e.g., date start times, duration and description). The full EIT contains 56 segments, where each segment corresponds to 3 hours of event data. The full EIT is transmitted at a high spool rate. Spool rate refers to the bandwidth allocated for the data, preferably in bytes per second.

Home transport 104 includes other system information (SI) data. Such other SI data includes network information tables (NITs), service information tables (SITs), program association table (PAT), program map table (PMT) and others. This information is defined by the DVD standard for SI information. See, "ETS 300 468, Digital Broadcasting Systems for Television, Sound and Data Services; Specification for Service Information (SI) in Digital Video Broadcasting Systems (DVB) Systems," which is hereby incorporated by reference herein in its entirety.

Home transport 104 also carries several services, i.e., the audio and visual data for a particular television channel, such as HBO. There are N services, service $1_{104}$ through service $N_{104}$ shown in the exemplary home transport. Conventionally, home transport 104 carries data associated with 3 of the provided services, as well as the overhead data described above.

There are N non-home transports $106_1$ through $106_N$. Conventionally, each non-home transport can carry data associated with 6 services. Five of the services are audio and visual program content. The sixth service is partial EIT data. The partial EIT data, is 2 segments of event data (corresponding to 6 hours of events) for all services. The partial EIT is transmitted at a high spool rate.

The number of transports is dependent upon the number of services that can be carried in a particular transport. Although conventional transports have data carrying capacities for carrying approximately 6 services, compression schemes have been developed which increase the number of services carried by each transport. Conventionally, the data in the segments is organized by service. That is, all of the data pertaining to service $1_{104}$ is sent, followed by all of the data for service $2_{104}$ and so on until all of the data for the service $N_{104}$ is sent.

Conventional set top boxes store only a small portion of the full EIT data stream. This is because they store all event information for every event in that stream. Unfortunately, conventional set top boxes only have on the order of 300 KB of memory for storing EIT data. This is far short of the approximately 3.5 megabytes of memory required on average to store all of the data sent on the full EIT data stream. In fact, only 2 segments or 6 hours of event data is stored in conventional STBs without compression. Even using complex compression schemes allows only up to 2 days of data to be stored. Thus, if a subscriber desires to view event data in the future, for example, 5 days from the present, the STB must somehow load this data so the subscriber can access it.

To view EIT information, a user scrolls through, for example, an electronic programming guide (EPG). The EPG is an application executing, for example, on a microprocessor in the STB, which displays to the user available programming for the time period of interest. However, if the subscriber wants to access any information beyond the information stored in the STB, and he or she is on any transport other than the home transport, the system will have to interrupt his or her viewing of the program to go get that information. This is because the set top box must tune to the home transport, wait for the program information pertaining to the subscriber's request to be downloaded, process that information, present it to the subscriber and then tune back to the non-home transport on which the subscriber's program is being carried. Such interruption is likely in most cases since the home transport carries very few of the services the subscriber may wish to access.

The ability to view EPG data without interrupting another service is particularly important in applications such as picture-in-picture (PIP). In the case of PIP, the subscriber views EPG data as part of the main screen or the picture-in-picture screen, while simultaneously viewing the original program. However, the convenience of PIP is greatly diminished if the set top box does not have all of the information for the 7-day period available to it, because the PIP screen must constantly be interrupted to get the EIT data for display on the EPG.

SUMMARY OF THE INVENTION

The present invention solves the problem of having only partial EIT data available to each transport by providing full EIT data (less the data carried by the partial EIT) to each of the non-home transports. To fit within the bandwidth allocated for non-home transports in conventional systems, the full EIT data is transmitted at a low spool rate. The low spool rate ranges from approximately 300 KB/s to 500 KB/s. In this manner, every transport has access to the full EIT seven day data, not just the six hours available to conventional systems. Consequently, except in rare cases, no tuning is required in most cases to respond to a subscriber's request for programming information because all of the data is available in the current transport. The present invention also retains the partial EIT data stream to maintain backward compatibility with conventional set top boxes.

As described above, conventional set top boxes store all event data related to each event for which they store information. However, there is a good deal of duplication in this information. For example, program reruns, duplicated showings of programs by different services often contain duplicate detailed descriptions. Other examples include near video-on-demand (NVOD) programming often contains many transmissions of the same events with time offsets on several services and music services, which contain continuous repetition of event information throughout the entire time period.

The present invention removes this duplication by storing only the unique information for each event or program, including its event ID and its start time, for each instance of the event in the EPG data stream. This unique information is small in terms of the amount of memory required to store it. The information common to that event and all other events having the same event-related information is stored in a separate structure accessible to each of those events. In this manner, the common information for each event is stored in one structure as opposed to every structure associated with that event. Using this storage architecture, a full 7-day EIT data stream can be stored in the memory available in conventional set top boxes. It should be noted that while no data compression is required to achieve the storage objects of the present invention, compression can be used for even greater storage savings.

In the preferred embodiment of the present invention, a segment data structure is used to store the start time of a particular segment, the number of events within that segment, and a pointer to a structure of event instances. The segment data structure is a small data structure, preferably having a length of 10 bytes. The segment data structure begins at the start time of each 3-hour segment that the data is organized in. There is one segment data structure per segment, and a total of 54 of these structures for the full 7-day event data. The reason only 54 segments are used is explained below. The 54-segment data structures are preferably store in a segment table.

Each segment data structure contains a pointer to an event instance table. The event instance table is preferably an array of event instance data structures. Each event instance data structure is also relatively small, preferably having a length of 12 bytes. The event instance data structures contain unique information about an instance of an event, for example, actual start time of that instance of the event. There is one event instance data structure for each event in a segment.

The detailed information for each event is stored in a separate data structure. There is one such structure for each unique event. All event instance data structures corresponding to a particular unique event point to the same event data structure, which stores the detailed information for that event. Each event data structure has a fixed portion, preferably having a length of 12 bytes, and a variable portion, preferably having an average length of 70 bytes.

In operation, when a subscriber requests program information for a particular time, the application (EPG, in the preferred embodiment) obtains the segment containing the particular time from the segment table. A pointer to the event instance array containing events beginning at the particular time is obtained. If detailed information for a particular event is required, the pointer to the detailed data structure corresponding to the event is obtained and used to get the detailed information.

Accordingly, one object of the present invention is to store seven days of EIT event data in a set top box without increasing the memory requirements of conventional set top boxes.

Another object of the present invention is to carry a full 7-day EIT data stream on each transport.

Another object of the present invention is to reduce or eliminate program interruption due to off-tuning the set top box to the home transport to load EIT data.

Another object of the present invention is to provide a data architecture for storing a full 7-day EIT data stream.

Another object of the present invention is to provide EIT data each non-home transport without increasing the bandwidth of the non-home transport.

These and other objects of the present invention are described in greater detail in the detailed description of the invention, the appended drawings and the attached claims.

DETAILED DESCRIPTION OF THE PREFERRED EMBODIMENTS

Figure 1A:
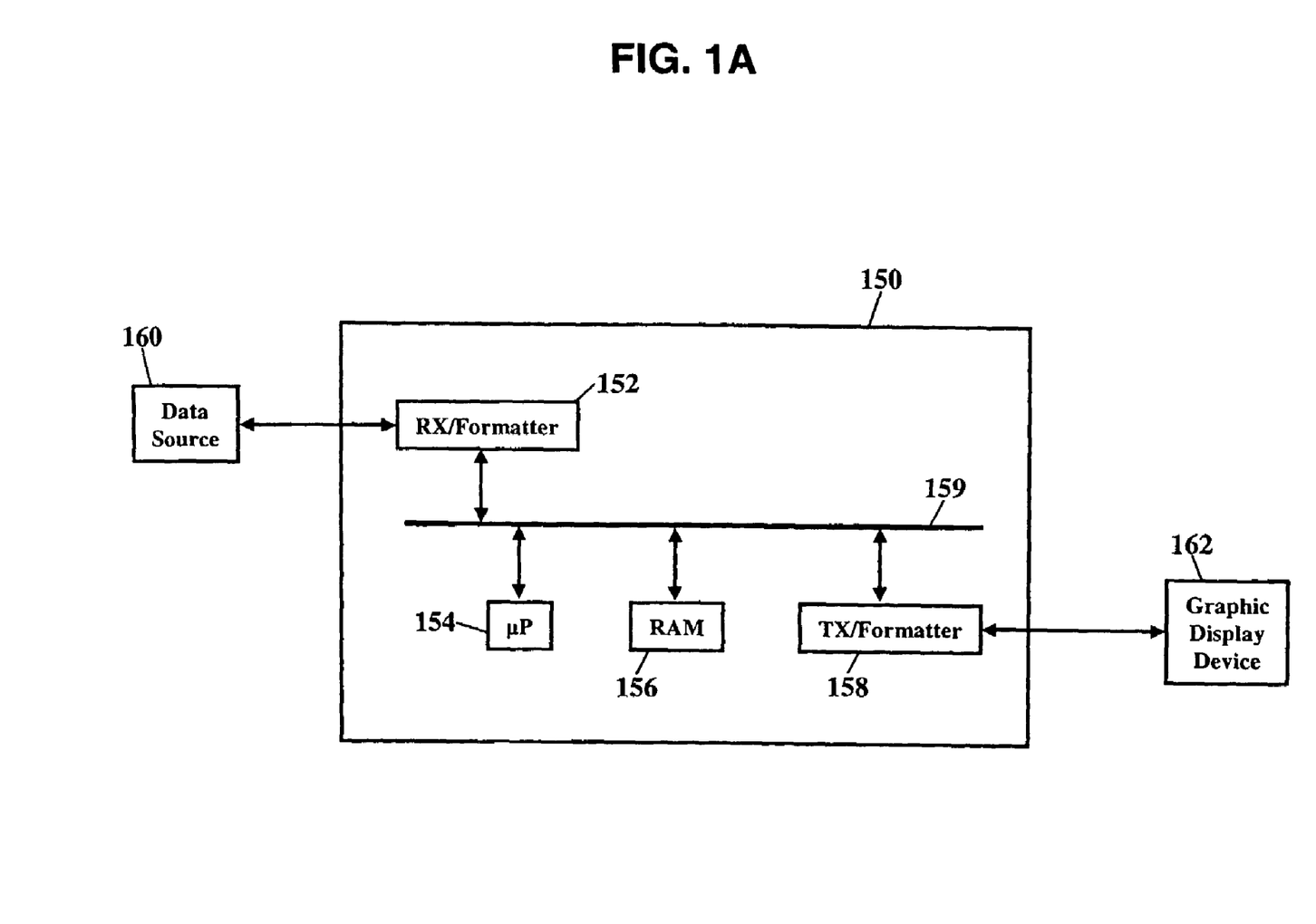
FIG. 1A is a schematic illustration of a set top box for use in a preferred embodiment of the present invention.

FIG. 1A is a schematic diagram of a set top box (STB) 150 that can be used in the preferred embodiment of the present invention. STB 150 includes a receiver 152 (e.g., a receiver/formatter), a microprocessor 154, a random access memory 156, and a transmitter 158. Receiver 152 receives service data from a data source, for example, a service provider such as a cable television company. Receiver 152 formats the data so that it can be processed by processor 154. Part of that data is the EIT data stream. Processor 154 processes the data, including the EIT data stream. Processing of the EIT data stream is described below. Processor 154 is preferably a microprocessor or microcontroller, but can be any processor that can perform the functions described herein. Processor 154 has available to it a memory 156 in which it stores EIT data or other data. Memory 156 is preferably a random access memory, but can be any memory which processor 154 can access. Transmitter 158 reformats the data, transmits it to a graphic display device 162 such as a television set.

Figure 2:
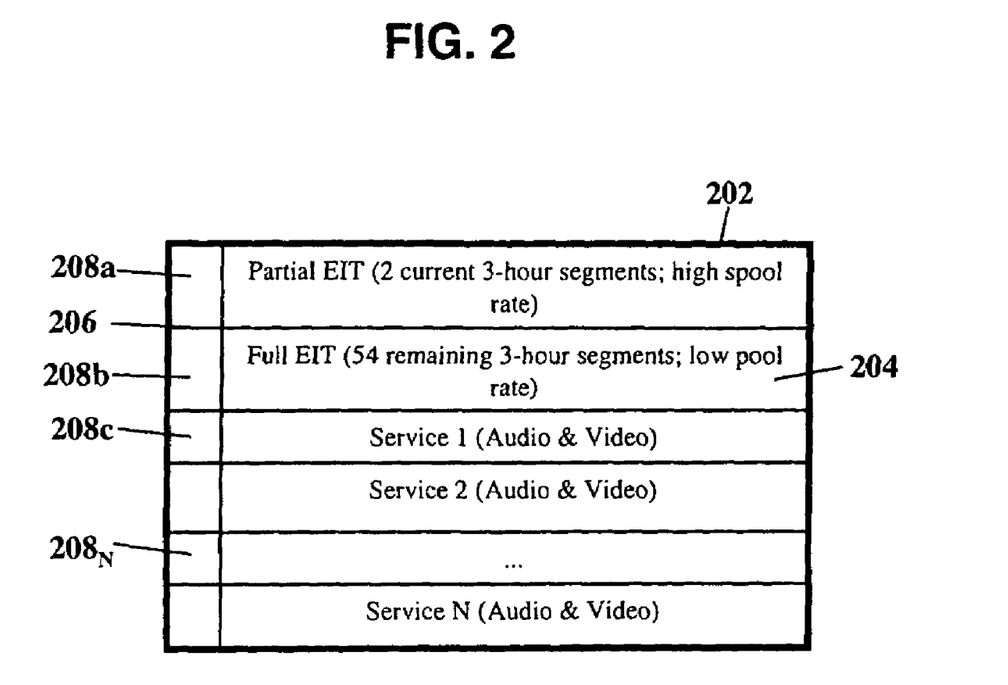
FIG. 2 is a schematic diagram illustrating a non-home transport according to a preferred embodiment of the present invention.

As described above, data from a service provider is sent in transports. FIG. 2 illustrates schematically a non-home transport according to a preferred embodiment of the present invention. Non-home transport 202 is modified from a conventional non-home transport by the addition of a full EIT data stream 204 and corresponding identifier 206. The new data is 54 segments rather than 56 segments because it does not repeat the information already transmitted in the partial EIT data (2 segments) described above. In an alternative embodiment of the present invention, the new data containing 56 segments are transmitted at the low-spool rate.

To maintain backward compatibility with existing set top box technology, this additional EIT data is transmitted at a low spool rate, thereby fitting in the bandwidth allotted to conventional non-home transports. Therefore, like conventional non-home transports, non-home transport 202 carries partial EIT data at a high spool rate, data corresponding to services 1–N and the requisite delimiting identifiers 208a–n.

The low spool rate full EIT data, combined with the high spool rate partial EIT provides complete 7-day information to every transport transmitted to the STB. Because all of the data is available in each transport, the STB does not have to off-tune from the transport on which the program the subscriber is viewing is located to fetch event programming information. Consequently, there is no, or at most minimal, service interruption to the subscriber.

If faster loading of the data is required, the set top box can tune to the home transport frequency and populate the set top box memory very quickly. The loading is faster because the full EIT is transmitted at a high spool rate. Interruption of service to the user can be minimized or eliminated using a segment locking technique (described below).

The present invention also reorders the events in the segments it receives. To maintain backward compatibility with existing set top boxes, only the new low spool rate EIT data is reorganized. The low spool rate full EIT data is reordered prior to transmission on the network to maximize the speed of parsing and storage of the data by the STB.

Conventionally, EIT data is organized by service across time. For example, to populate the data structures corresponding to programs that come on at 8 o'clock, the STB has to go through all of the received data. Thus, to get to the data corresponding to service 4 for the 8 o'clock time slot, all of the data corresponding to services 1 through 3 must be reviewed.

Figure 3:
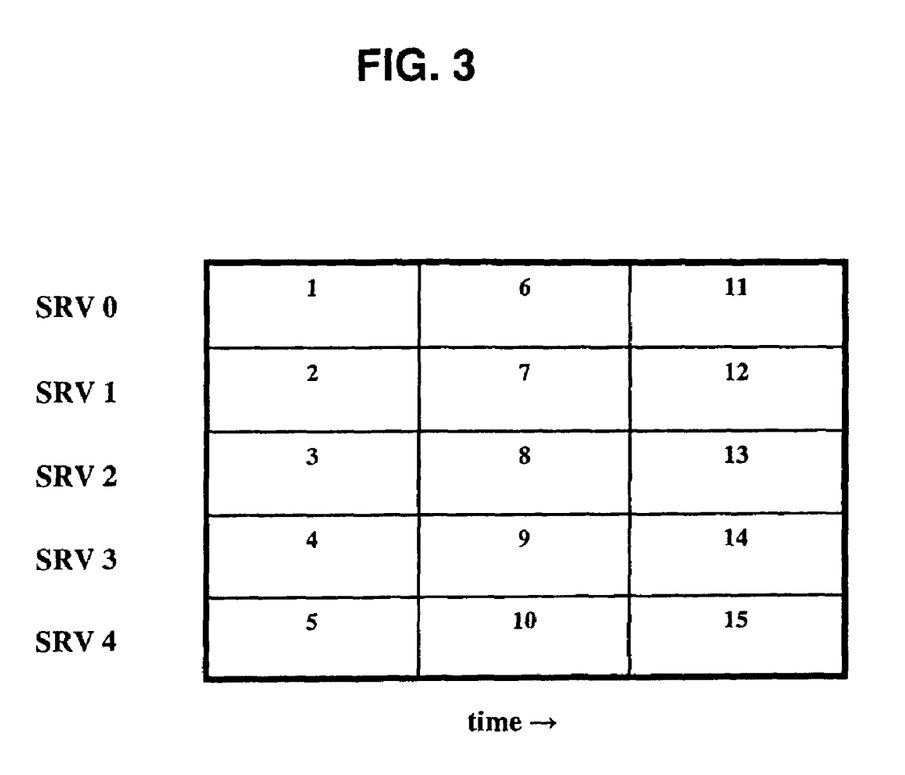
FIG. 3 is a schematic diagram illustrating a segment interlacing in a set top box according to a preferred embodiment of the present invention.

In the preferred embodiment of the present invention, the data is reorganized according to time. That is, all of the programs starting at a given time are together. For example, all programs starting at 8 o'clock are transmitted sequentially, then the data for all of the programs starting at 9 o'clock, and so on. Thus, the first hour of the 3-hour segment of data corresponding to service 1 is followed by the first hour of the 3-hour segment of data corresponding to service 2 and so on through the first hour of the 3-hours segment corresponding to service N. This is followed by second hour of the 3-hour segment of data corresponding to service 1, followed by the second hour of the 3-hour segment of data corresponding to service 2 and so on. This continues through the third hour of the 3-hour segment of data corresponding to service N. This interleaving by time facilitates extracting the data by time rather than by service. For example, FIG. 3 shows a segment 302 having 15 events labeled 1–15 respectively. According to a preferred embodiment of the present invention, the events are loaded in order 1–15, rather than in the order 1, 6, 11, 2, 7, 12, 3, 8, 13, 4, 9, 14, 5, 10, 15 as in conventional systems.

This reorganization facilitates retrieving event data for viewing programming by time rather than by service, which is how most subscribers tend to view programming. That is, more subscribers desire to see which programs are on at a given time rather than which programs are offered by a particular service for different times. The present invention allows both kinds of viewing but facilitates viewing by time as opposed to viewing by service. In addition, reorganizing the data facilitates locking a time segment (detailed below). That is, if the subscriber interrupts the loading of the new information to look at the guide, the time segment can be locked because the data is now organized by time instead of service.

Another reason for reorganizing the data to load by time is that if there is too much data to fit in the memory of the set top box, the set top box can stop loading data. When the data is organized by time, only certain times, most likely for programs several days out, are lost. Using the conventional loading, by service, current data for some, and possibly data for entire services is likely to be lost.

Although the preferred method is to stream the data by time by service, it should be noted that the present invention can operate using data organized as in conventional systems. That is, the data structures of the present invention can be populated as the data is loaded into the set top box even when it is transmitted by service rather than time. Thus, conventional data streaming by service by time falls within the scope and spirit of the present invention.

The reordering also allows data to be loaded much faster than in conventional systems. Conventional systems require approximately 20 seconds to load a single segment of data. Using the reordering scheme of the present invention, 56 segments, i.e., the full 7-day EIT data can be loaded in approximately 90 seconds. The reason for this speed up is that in conventional systems there is a delay between the loading of each segment introduced by the system waiting for the entire EIT data to cycle and restart so that the system can load the next desired segment. By reordering the segments based on the start times, as described above, the system does not experience this delay because each segment is transmitted in the order in which the system is loading the segments, thereby eliminating the wait for the next cycle of the EIT data.

Because the data is spooled at a high rate (ranging from 1 MB/s to 4 MB/s) on the home transport, if there is a requirement that the data be refreshed rapidly, the set top box can tune to the home transport to obtain the high spool rate EIT data. This might be useful in the case where a subscriber interrupts the normal data refresh cycle (described below) and tries to access information. In that case, the EPG immediately tunes to the home transport, loads the data very quickly and provides service rapidly back to the subscriber. In that instance, there might be a short service interruption.

There is, however, a mechanism built into the STB's application programming interface (API) for accessing the data structures that allows the application to asynchronously lock and access individual segments. So, if the STB is loading data and the subscriber attempts to look at the data for the current time, for example, the EPG can lock the segment of data having the current time information, while the other data is loading in the background. In this way, the EPG can use the locked data immediately, while the other segments are being updated in the background, thereby reducing or entirely eliminating service interruption to the user.

Preferably, the data is refreshed every day when the set top box is normally idle (e.g. at 3 am). To refresh the data, the EPG accesses the partial and/or full EIT data streams on which the program information is transmitted, and repopulates the data structures (described below) with the most up-to-date EIT data. This process of loading the data into the set top box at a low spool rate is sometimes referred to as trickle feeding the data.

However, some situations requires that the data be updated more frequently or at a time when the set top box is not idle. For example, if there is a change to a program line-up or some other situation which requires a the EPG data to be fully rebuilt (i.e., re-spooled for transmission to all STBs). In such a case, all the SI data is rebuilt and respooled. Because the version numbers of the EIT data and other SI tables change, the set top box is aware that there are new tables that have to be loaded. The set top boxes automatically begin to reload this new data.

The rebuild can also be performed manually by an operator editing the data, and pressing a rebuild button at the service provider's location. When the operator presses the rebuild button, the rebuild occurs automatically. The rebuild occurs on a separate machine. While the data is being rebuilt, the system is operating from the old data. Once the data is rebuilt, the data is transferred to the spooler. The spooler is restarted and begins to send out the new data. The set top boxes then pick up the new data. Thus, there is never a point in time where the set top box has no data to operate from. It is either operating off of the old data, or loading and beginning to operate from the new data.

The NIT and SIT contain all the information about where each channel is, and how to tune to it, for example channel frequencies and channel synchronization information. Thus, any changes to the NIT or SIT must be sent to the set top boxes very quickly. Otherwise, problems could result. For example, if the service lineup changed and a service containing adult content is swapped with the Disney channel, there might be irritated subscribers. To achieve this, preferably the NIT and SIT are spooled at a high spool rate to maximize the speed of access and data availability to the STB As described above, there is a great deal of redundancy in the EIT data. It is preferable to remove the redundancy at the set top box when the data comes in. This preserves backward compatibility with existing set top boxes. This is because conventional set top boxes are not designed to use the redundancy elimination process. Thus, those STBs could not process data that has already been collapsed. If backward compatibility is not an issue, the redundancy can be eliminated prior to transmitting it to the subscriber, for example, by the service provider.

The incoming EIT data is used to build the tables described above, including the segment table and the event instance table. Preferably the tables are stored as arrays, though other storage paradigms would be known to those skilled in the art.

Figure 4:
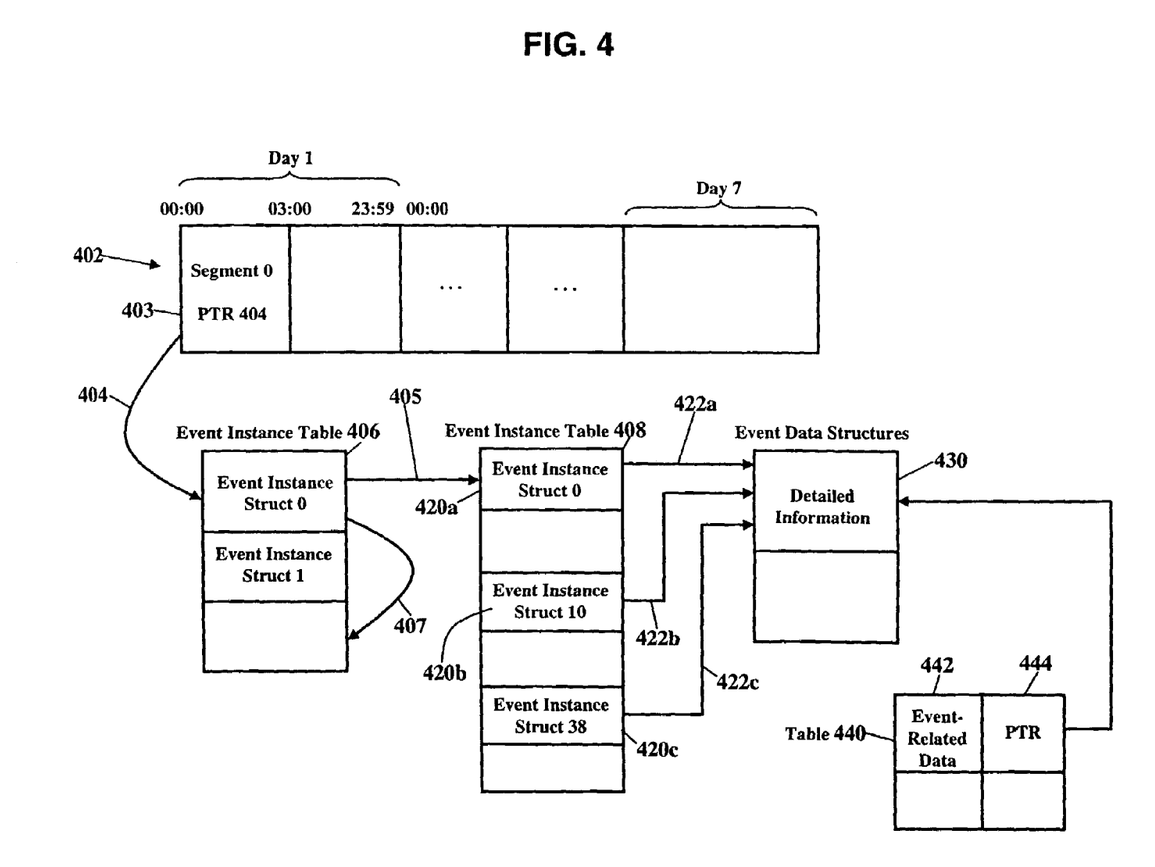
FIG. 4 is a schematic diagram illustrating a data storage architecture according to a preferred embodiment of the present invention.

An exemplary segment table 402 is shown in FIG. 4. As shown in FIG. 4, the segment table preferably starts with segment 0, which corresponds to midnight of DAY 1 of the 7-day period. A segment data structure, such as segment data structure 403, is created for segment 0. Similar structures are created for each of the other segments in the 7-day period as the data is streamed in. Recall that in the preferred embodiment, data for the two current segments is obtained from the partial EIT data. Each segment data structure preferably includes simple information related to that segment, including the number of events which start in that segment and a pointer to the event instance table containing the events corresponding to that segment. This pointer is also referred to alternatively herein as an event instance table pointer. For example, pointer 404 is a pointer from segment 0 to event instance table 406, which is the event instance table corresponding to segment 0. There are 56 segment data structures corresponding to the 56 segments required for a 7-day period of EPG data.

The following is a C programming language construct for the segment table structure in the preferred embodiment of the present invention:

```
startTimesStruct        segmentheader[SEGMENTS_PER_WEEK];
struct startTimesStruct
{
    u_int8                 numEventInstances;
    tmEventInstanceStruct  EventInstances;       /* Pointer to
                                                    array of fixed
                                                    length event
                                                    instances */
}
```

In the example, the value of SEGMENTS_PER_WEEK is 56.

The event instance table contains information unique to the particular instance of that event, including event ID (the title of the program) and the start time of the program. In the preferred embodiment, the event instance table is an array of structures, for example, event instance table 406, which corresponds to segment 0 and event instance 408, which corresponds to another of the 56 segments, for example, segment 1. The following is a C programming language construct of a structure component of event instance table 402, for example Event Instance Struct 0:

```
struct tm EventInstanceStruct
{
    u_int32            StartTime;
    u_int16            eventID;
    u_int16            serviceID;
    tmEventDataStruct  eventData           /*pointer to variable
                                             length event */
    int16              nextIndexByCron;
    int16              nextIndexByServiceID;
}
```

The StartTime field stores the start time of the event in seconds since 12:00:00 am, Jan. 1, 1970. The eventID stores the unique number identification of the event. The serviceID field stores the identification of the service that provides the event. The nextIndexByServiceID field is a pointer that points to the event instances data corresponding to the next program on a particular service. The nextIndexByCron field is a pointer to the event instance data corresponding to the next service's program for a particular time. In the preferred embodiment, the nextIndexByCron field is not required because the next event by time is the next event structure in the event instance table array. That is, the next event by time can be found by incrementing the event instance table array index by 1. This is the event corresponding to the next service at that time.

The nextIndexByCron (if used, or incrementing the event instance table array by 1 if it is not used) and the nextIndexByServiceID fields facilitate the EPG's traversing through the EIT data. For example if a subscriber is viewing the program information for 8 o'clock on HBO, he or she could either traverse by time to see what's on the next channel (e.g., Showtime) at 8 o'clock or traverse by service to see what is on next on HBO by incrementing the value of the nextIndexByServiceID field. An example pointer by time is pointer 405 and an example pointer by service is pointer 407.

The data structures of the present invention significantly reduce duplication in the EIT data storage. Any data common to multiple event instances is stored in an event data structure. The event data structure for a particular event is pointed to by a pointer, referred to herein alternatively as an event data structure pointer, which is stored in the event instance structure corresponding to that event. Each event data structure contains the full information related to a particular event. Full information about an event includes its description, its cast, the year it was made, its rating and the like. Like event instances have a pointer to the same event data structure, which contains the common detailed information for those events. Therefore, the present invention collects and stores all of the data common to particular event instances in a single event data structure. For example, event instances 420a, 420b and 420c in FIG. 4 correspond to like events. Thus, each points to detailed event data structure 430, which contains the detailed information common to event instances 420a, 420b and 420c via respective pointers 422a, 422b and 422c. A C programming language construct of an event data structure is given below:

```
struct tmEventDataStruct
{
    u_int16         duration;
    u_int16         eventFlags;
    u_char          textlen;
    u_char          descriptionLen;
    u_int8          numExtras;
    u_char          Text[];
    u_char          Description[];
    u_char          Extras[];
}
```

The duration field stores the length of the event in seconds. The eventFlags is a bit field indicating content information as defined in the DVB Content Descriptor. The textlen field stores the length in bytes of the event title. The descriptionLen field stores the length in bytes of the description of the event. The numExtras field stores the number of DVB or private descriptors includes in the Extras array, Extras[ ]. The Text [ ] field is a pointer to the event title text. The Description[ ] field is a pointer to the event description text. The Extras[ ] field is an array of pointers to DVB or private descriptors for the event.

As event data streams into the set top box, the events contained therein are checked to see if they are new events or if information regarding those events has already been stored. For new events, an event data structure is created to hold detailed information corresponding to the event and a pointer to the new data structure is stored in the corresponding event instance structure created in the event instance table. For old events, i.e., those for which detailed information is already stored, only the unique information corresponding to the event instance is stored in the event instance table. In addition, a pointer to the detailed information corresponding to that event which had been stored previously is stored in the event instance table.

Using this method, seven days of information can be stored in full detail and all additional detail associated with events in less than 1 MB of RAM. Thus, a full 7-days of EIT data can be stored in conventional set top boxes. Further storage savings can be accomplished by applying lossless compression algorithms which are well-known to those skilled in the art.

The present invention also improves the efficiency of checking for the occurrence of an event. One way to perform this check is to compare each new event to every event that has been processed as the data is streaming in to the STB. A match indicates that there is already a detailed event structure associated with that event. However, searching through all event data for each event can be time consuming and inefficient.

In the preferred embodiment of the present invention, a separate table 440 is created to overcome this inefficiency. Table 440 is alternatively referred to herein as an event-related data table. Each entry in the table stores event-related data 442 and a pointer 444 to the detailed event data structure corresponding to the event related data. Event-related data 442 is data related to a unique event. Event-related data 442 can be the event ID, the detailed data associated with an event, any other information associated with an event, or any combination, in whole or in part, of the aforementioned event information. In the preferred embodiment, as events stream into the set top box only the table of event-related data is checked to see if the event-related data is unique or has already been processed.

In an alternative preferred embodiment, separate table 440 is a hashing table in which the event-related data is hashed prior to being stored. Hashing often results in more efficient storage of information. As data is streamed in, event-related data 442 is hashed. The hashed event-related data 442 is compared to the entries already stored in the table. If the hashed event-related data 442 does not match an entry in the table, a new entry in the hash table is created, with the hashed value of the event-related data 442 and a pointer to the event data structure containing the detailed information corresponding to event-related data 442.

Searching table 440, whether event-related data 442 is hashed or not, is faster than searching through the event data structures. However, it requires more memory because separate table 440 must be stored. Thus, a consideration is whether there is sufficient memory in the set top box to implement the table. In the preferred embodiment, there is sufficient memory available after the redundancy in the 7-day data is removed by the technique of the present invention.

Table 440 is created in the following manner. The first event received is automatically stored in the table because the table is empty at this point, and therefore there are no events to match. The event-related data is collected and stored. If hashing is used, the event-related data is input to a hashing algorithm such as the well-known MD5 algorithm and the output of the algorithm is stored as the event-related data. In addition, a pointer to the detailed event data structure associated with the event-related data is stored in the table. Event-related data from each subsequent event is then compared to the event-related data stored in the table. If there is no match, event-related data 442 is stored along with a pointer to the detailed event data structure. As described below, that event-related data 442 may be hashed prior to comparison with the data stored in the table. If there is a match, then the pointer to the detailed event data structure is obtained and stored in the event instance structure corresponding to the event.

Figure 5:
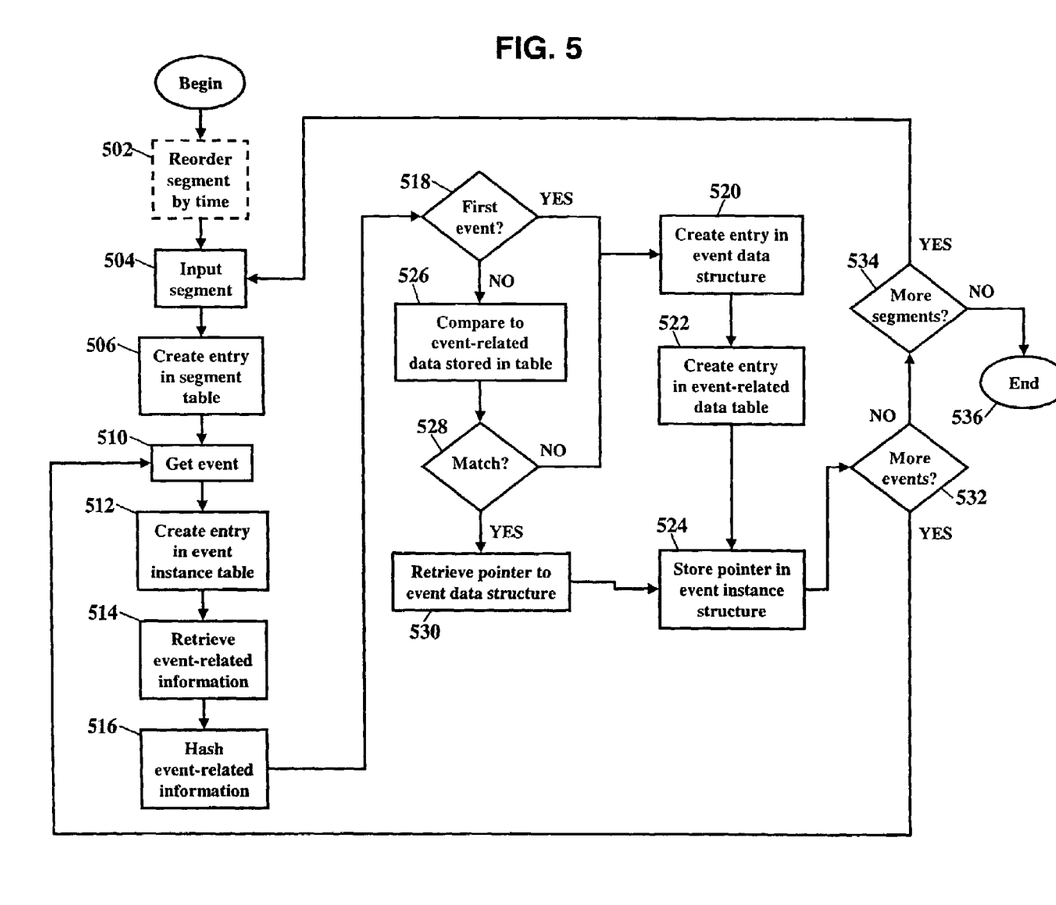
FIG. 5 is a flow chart for storing EIT data according to a preferred embodiment of the present invention.

A method according to a preferred embodiment of the present invention is illustrated by flow chart 500 in FIG. 5. Preferably the steps of flow chart 500 are performed by microprocessor 154 (shown in FIG. 1A). The method begins in step 502 whereupon processor 154 immediately executes step 503. In step 503, the data in the new EIT data stream sent in the non-home transports (see FIG. 2) is reordered by time. Processor 154 then continues in step 504 where a segment is input from the data stream. Processor 154 creates an entry corresponding to the segment in segment table 402 in step 506. In step 510, processor 154 extracts the next event. The first time through the process illustrated in flow chart 500 the next event is the first event. Microprocessor 154 then creates an event instance entry for this event in event instance table 406 in step 512. In step 514, microprocessor 154 retrieves event-related data from the event data. Optionally, processor 154 hashes the event-related data in step 516.

In step 518, processor 154 determines whether the current event is the first event. If it is the first event, processor 154 continues in step 520 where it creates an event data structure containing the detailed information corresponding to the event. In addition, it stores the event-related data and a pointer to the event data structure corresponding to this event in the event-related data table. It also stores the pointer to the detailed event data structure in the event instance corresponding to this event in step 524.

If, in step 518, processor 154 determines that this is not the first event, processor 154 continues in step 526 where it compares the event-related data to the event-related data in the event-related data table. In the preferred embodiment, comparisons are made until a match is found or the end of the table is reached, as shown in step 528. If there is no match, processor 154 continues in step 520 as described above.

If there is a match, then the detailed information corresponding to this event is already available and need not be stored again. Thus, all that is required is to fetch the pointer to the detailed information associated with this event. This is done by retrieving the pointer associated with the matching event-related data. Processor 154 retrieves this pointer in step 530 and stores it in the event instance for this event in step 524.

After storing the pointer to the event data structure in the event instance table, processor 154 continues process 500 by determining, in step 532, if there are more events in the segment. If there are more events, processor 154 continues in step 510 by getting the next event. If there are no more events in the segment, processor 154 continues in step 534 where it determines if there are any additional segments to process. If there are more segments to process, processor 154 continues in step 504 by getting the next segment. If there are no more segments, processor 154 continues terminates the process in step 536.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for storing programming data, comprising the steps of:
   receiving a segment of programming data;
   storing said segment;
   creating a single segment data structure per segment of the programming data, each segment data structure comprising a start time for the segment, a number of events within the segment, and an event instance table pointer pointing to an event instance table; and
   storing the event instance table pointer.

2. A method according to claim 1, wherein the event instance table comprises an event instance data structure for each event in the segment, the event instance data structure storing detailed information for a particular instance of each event and an event data structure pointer.

3. A method according to claim 2, further comprising storing the event data structure pointer in the event instance data structure.

4. A method according to claim 1, wherein the event instance table comprising an event data structure pointed to by the event data structure pointer, the event data structure storing common information for multiple instances of the same event.

5. A method according to claim 1, further comprising the step of extracting event-related data pertaining to a particular event.

6. A method according to claim 5, wherein if the extracted event-related data matches the previously stored event-related data, then obtaining an event data structure pointer to detailed data associated with the event.

7. A method according to claim 5, further comprising the step of hashing the event-related data.

8. A method according to claim 1, further comprising the step of comparing extracted event-related data to event-related data previously stored in an event instance data structure.

9. A computer program product comprising computer-readable instructions for performing the steps:
   receiving a segment of programming data;
   storing said segment;
   creating a single segment data structure per segment of the programming data, each segment data structure comprising a start time for the segment, a number of events within the segment, and an event instance table pointer pointing to an event instance table; and
   storing the event instance table pointer.

10. A computer program product according to claim 9, further comprising instructions for an event instance data structure for each event in the segment, the event instance data structure storing detailed information for a particular instance of each event and an event data structure pointer.

11. A computer program product according to claim 10, further comprising instructions for storing the event data structure pointer in the event instance data structure.

12. A computer program product according to claim 9, further comprising instructions for an event data structure pointed to by the event data structure pointer, the event data structure storing common information for multiple instances of the same event.

13. A computer program product according to claim 9, further comprising instructions for extracting event-related data pertaining to a particular event.

14. A computer program product according to claim 9, further comprising instructions for comparing extracted event-related data to event-related data previously stored in an event instance data structure.

15. A computer program product according to claim 14, further comprising instructions for wherein if the extracted event-related data matches the previously stored event-related data, then obtaining an event data structure pointer to detailed data associated with the event.

16. A computer program product according to claim 9, further comprising instructions for hashing the event-related data.

17. A method for retrieving programming data, comprising the steps of:
receiving a request for programming information for a time of day;
retrieving a segment of programming information corresponding to the time of day;
retrieving a first pointer to a first memory structure, the first memory structure storing unique programming information for an event occurring in the segment;
retrieving a second pointer to a second memory structure, the second memory structure storing common programming information for multiple occurrences of the same event;
retrieving the unique programming information; and
retrieving the common programming information.

18. A method according to claim 17, wherein the step of retrieving the unique programming information comprises retrieving an event identification and a start time of the event.

19. A method according to claim 17, wherein the step of retrieving the unique programming information comprises retrieving a unique number identifying the event.

20. A method according to claim 17, further comprising retrieving an identification of a service that provides the event.

21. A method according to claim 17, further comprising retrieving an identification of a next event provided by a service.

22. A method according to claim 17, further comprising retrieving a length of the event.

23. A method according to claim 17, further comprising incrementing in an array to obtain an identification of a next event provided by a service.

24. A method according to claim 17, wherein the step of retrieving the common programming information comprises retrieving information describing at least one of a tide of the event a cast appearing in the event, a year the event was made, and a rating for the event.

25. A method according to claim 17, further comprising comparing whether the unique programming information for the event has been previously processed.

* * * * *